United States Patent
Peng et al.

(10) Patent No.: US 10,613,367 B2
(45) Date of Patent: Apr. 7, 2020

(54) LIQUID CRYSTAL DISPLAY ASSEMBLY AND ELECTRONIC DEVICE

(71) Applicant: Lenovo (Beijing) Co., Ltd., Beijing (CN)

(72) Inventors: Shaopeng Peng, Beijing (CN); Nan Lin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 39 days.

(21) Appl. No.: 15/729,142

(22) Filed: Oct. 10, 2017

(65) Prior Publication Data
US 2018/0246359 A1    Aug. 30, 2018

(30) Foreign Application Priority Data
Feb. 27, 2017    (CN) .......................... 2017 1 0109289

(51) Int. Cl.
*G02F 1/1333* (2006.01)
*G02F 1/1343* (2006.01)
(Continued)

(52) U.S. Cl.
CPC ...... *G02F 1/13338* (2013.01); *G02F 1/13394* (2013.01); *G02F 1/133512* (2013.01);
(Continued)

(58) Field of Classification Search
CPC ........... G02F 1/13338; G02F 1/133512; G02F 1/134309; G02F 1/133514; G02F 1/13394; G02F 2001/133302; G02F 1/133308; G02F 2001/13398; G02F 2001/13312; G06F 3/0414; G06F 3/0412; G06F 3/044; G06F 3/0421; G06F 3/045; G06F 3/041; G06F 3/0416; G06F 3/0488; G06F 2203/04107; G06F 2203/04103; G06F 2203/041; G06F 3/03547; G06F 3/0418; G06F 3/046; G06F 3/047; G06K 11/06; H05K 9/0079; H05K 9/0073; H05K 9/0081; H05K 9/0088
(Continued)

(56) References Cited

U.S. PATENT DOCUMENTS

2007/0097278 A1*   5/2007   Rho ..................... G02F 1/13338
                                                    349/12
2010/0156827 A1*   6/2010   Joo ..................... G02F 1/13338
                                                    345/173
(Continued)

FOREIGN PATENT DOCUMENTS

| CN | 101713878 A | 5/2010 |
| CN | 102736344 A | 10/2012 |
| CN | 103777830 A | 5/2014 |

*Primary Examiner* — Shan Liu
(74) *Attorney, Agent, or Firm* — Anova Law Group, PLLC

(57) ABSTRACT

A liquid crystal display module (LCDA) and electronic device are provided. The LCDA includes a first glass layer, and a second glass layer arranged with the first glass layer having liquid crystals filled there-between. The LCDA also includes at least one sensing device. Each sensing device includes at least one electrode group. Each electrode group is between the first glass layer and the second glass layer, and includes a first electrode bonded to the first glass layer and a second electrode bonded to the second glass layer. A gap separates the first electrode from the second electrode.

19 Claims, 4 Drawing Sheets

(51) Int. Cl.
*G02F 1/1335* (2006.01)
*G02F 1/1339* (2006.01)
*G06F 3/041* (2006.01)
*G06F 3/044* (2006.01)

(52) U.S. Cl.
CPC .. *G02F 1/133514* (2013.01); *G02F 1/134309* (2013.01); *G06F 3/0412* (2013.01); *G06F 3/04146* (2019.05); *G02F 1/133308* (2013.01); *G02F 2001/13398* (2013.01); *G02F 2001/133302* (2013.01); *G06F 3/044* (2013.01)

(58) Field of Classification Search
USPC .............................................. 349/12; 345/173
See application file for complete search history.

(56) References Cited

U.S. PATENT DOCUMENTS

| | | | | |
|---|---|---|---|---|
| 2010/0194709 | A1* | 8/2010 | Tamaki | G02F 1/13338 345/174 |
| 2015/0077380 | A1* | 3/2015 | Hayashi | G06F 3/044 345/173 |
| 2016/0328057 | A1* | 11/2016 | Chai | G06F 3/0412 |
| 2018/0246370 | A1* | 8/2018 | Chen | G02F 1/133514 |

* cited by examiner

Power Transfer Enabled

LIQUID CRYSTAL DISPLAY ASSEMBLY AND ELECTRONIC DEVICE

CROSS-REFERENCES TO RELATED APPLICATIONS

This application claims priority of Chinese Patent Application No. 201710109289.4, filed on Feb. 27, 2017, the entire contents of which are hereby incorporated by reference.

FIELD OF THE DISCLOSURE

The present disclosure generally relates to the field of electronic technology and, more particularly, relates to a liquid crystal display module (LCDA) and an electronic device.

BACKGROUND

Touch panel, also known as touch-control screen or touch-control panel, is an induction-type liquid crystal display device that can receive touch-induced input signals. FIG. 1 shows a schematic structural view of a touch panel. From the top to the bottom of FIG. 1, the touch panel includes a cover glass, a liquid crystal display module, an air gap, a force sensor, a cushion layer, and a middle-frame (MF) layer. Moreover, the MF layer is also the ground (GND).

When the surface of the touch panel is pressed by applying a force, the distance between the force sensor and the GND may be changed. As shown in FIG. 1, assuming the force is applied along the direction indicated by the arrow, the layers in the touch panel may be deformed as schematically illustrated by the dotted lines in FIG. 1. Further, the capacitance of a capacitor is calculated using the formula: $C=\varepsilon \times S/(4\pi kd)$, where S is the area that the force sensor directly faces to the MF layer, k is the electrostatic constant (i.e., Coulomb's constant), $\varepsilon$ is a relative dielectric constant, and d is the distance between the force sensor and the MF layer. According to the formula, when the distance d is changed, the capacitance C may also be changed. Therefore, whether the user touches the touch panel may be determined by monitoring the changes in the capacitance C.

However, current touch panels are undesirably too thick. The disclosed liquid crystal display assembly and electronic device are directed to solve one or more problems set forth above and other problems.

BRIEF SUMMARY OF THE DISCLOSURE

One aspect of the present disclosure provides a liquid crystal display assembly (LCDA). The LCDA includes a first glass layer, and a second glass layer arranged with the first glass layer having liquid crystals filled there-between. The LCDA also includes at least one sensing device. Each sensing device includes at least one electrode group. Each electrode group is between the first glass layer and the second glass layer, and includes a first electrode bonded to the first glass layer and a second electrode bonded to the second glass layer. A gap separates the first electrode from the second electrode.

Another aspect of the present disclosure provides an electronic device. The electronic device includes an LCDA. The LCDA includes a first glass layer, a second glass layer arranged with the first glass layer having liquid crystals filled there-between, and at least one sensing device. Each sensing device includes at least one electrode group. Each electrode group is between the first glass layer and the second glass layer, and includes a first electrode bonded to the first glass layer and a second electrode bonded to the second glass layer. A gap separates the first electrode from the second electrode.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to various embodiments of the disclosure, which are illustrated in the accompanying drawings. Wherever possible, the same reference numbers will be used throughout the drawings to refer to the same or like parts. The described embodiments are some but not all of the embodiments of the present disclosure. Based on the disclosed embodiments and without inventive efforts, persons of ordinary skill in the art may derive other embodiments consistent with the present disclosure, all of which are within the scope of the present disclosure.

The disclosed embodiments in the present disclosure are merely examples for illustrating the general principles of the present disclosure. Any equivalent or modification thereof, without departing from the spirit and principle of the present disclosure, falls within the scope of the present disclosure.

Figure 2:
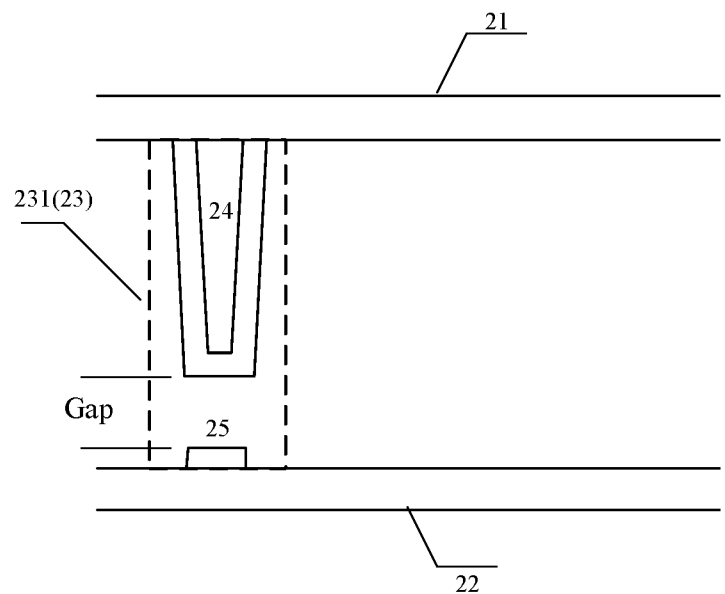
FIG. 2 illustrates a schematic structural view of a liquid crystal display assembly (LCDA) consistent with some embodiments of the present disclosure.

The present disclosure provides a liquid crystal display assembly (LCDA). FIG. 2 shows a schematic structural view of an example of LCDAs consistent with some embodiments of the present disclosure.

Referring to FIG. 2, the LCDA may include a first glass layer 21, a second glass layer 22, and at least one sensing device 23. Moreover, the second glass layer 22 may be arranged under the first glass layer 21, and liquid crystals may be filled into the space between the first glass layer 21 and the second glass layer 22. The sensing device 23 may include at least one electrode group 231. Each electrode group 231 may be formed between the first glass layer 21 and the second glass layer 22, and may include a first electrode 24 and a second electrode 25 corresponding to the first electrode 24. Further, the first electrode 24 may be bonded to the first glass layer 21 and the second electrode 25 may be bonded to the second glass layer 22. A gap may separate the first electrode 24 from the corresponding second electrode 25 in each electrode group 231.

In one embodiment, as shown in FIG. 2, each sensing device 23 of the LCDA may include only one electrode group 231. That is, the electrode group 231 may be functioned as the sensing device 23.

When an external force is applied on the surface of the LCDA, the gap between the first electrode 24 and the second electrode 25 may be reduced, which may further cause the first electrode 24 to be in contact with the second electrode 25.

In one embodiment, whether an operator (or a user) touches the surface of the LCDA may be determined based on whether the first electrode 24 touches the second electrode 25. For example, when the first electrode 24 and the second electrode 25 are in contact with each other, a current may flow through both the first electrode and the second electrode, indicating that an operator touches the surface of the LCDA. The current may flow from the first electrode to the second electrode, or vice versa.

According to the disclosed LCDA, the first electrode and the second electrode may contact with each other when an external force with appropriate strength is applied; when the external force is removed, the first electrode and the second electrode may be separated from each other, and no current may flow through the first electrode and the second electrode. That is, without applying the external force onto the surface of the LCDA, the first electrode and the second electrode may be separated by a gap; by applying an appropriate external force onto the surface of the LCDA, the first electrode and the second electrode may be brought to contact with each other.

The disclosed LCDA combines the function of a conventional LCDA with the function of a force sensor or a pressure sensor. Moreover, because of the simultaneous realization of the functions of the conventional LCDA and the force sensor, the air gap (referring to FIG. 1) may not be a necessary component in the disclosed LCDA. Therefore, the thickness of the touch panel based on the disclosed LCDA may be reduced.

Figure 3:
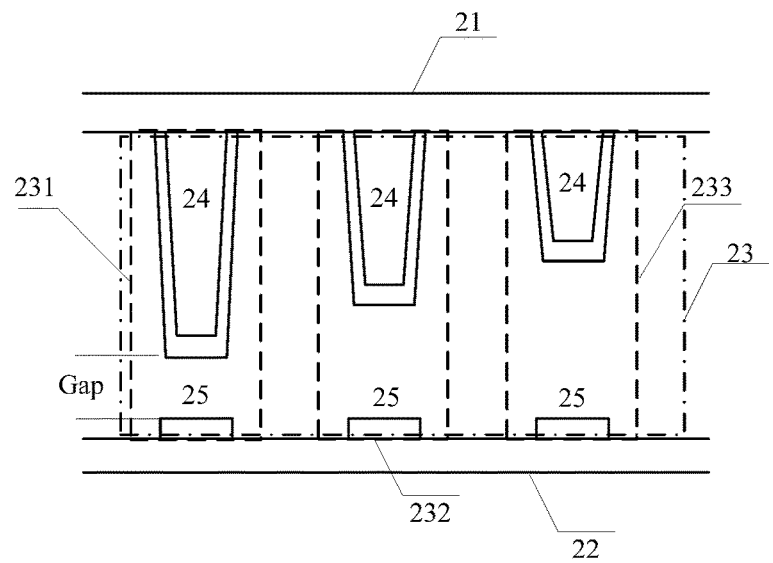
FIG. 3 illustrates a schematic structural view of another LCDA consistent with some embodiments of the present disclosure.

The LCDA shown in FIG. 2 is an example where each sensing device 23 includes only one electrode group. In other embodiments, each sensing device may include at least two electrode groups. FIG. 3 shows a schematic structural view of an LCDA with the sensing device in the LCDA including more than one electrode groups consistent with some embodiments of the present disclosure.

Referring to FIG. 3, the sensing device 23 may include three electrode groups, namely, electrode group 231, electrode group 232, and electrode group 233. It is noted that the structure shown in FIG. 3 only schematically provides an example of LCDAs having more than one electrode groups in each sensing device. Therefore, the number of electrode groups in each sensing device of the LCDA may be any integer number equal to or greater than 2.

Further, the plurality of sensing devices 23 may have an identical structure including multiple electrode groups. In addition, for different electrode groups in each sensing device 23, the size of the gap between the first electrode 24 and the second electrode 25 may be different. As shown in FIG. 3, the gap 1 between the first electrode 24 and the second electrode 25 in the electrode group 231, the gap 2 between the first electrode 24 and the second electrode 25 in the electrode group 232, and the gap 3 between the first electrode 24 and the second electrode 25 in the electrode group 233 may all have different values.

When the sensing device 23 includes multiple electrode groups, the gap between the first electrode 24 and the second electrode 25 may be different for different electrode groups. For example, as shown in FIG. 3, the heights of the second electrodes 25 in different electrode groups may be the same, and the heights of the first electrodes 24 in different electrode groups may be different. In some other embodiments, the heights of the first electrodes 24 in different electrode groups may be the same, and the heights of the second electrodes 25 in different electrode groups may be different. Moreover, as long as the gap between the first electrode 24 and the second electrode 25 is different for different electrode groups, the heights of the first electrodes 24 in different electrode groups may be different and the heights of the second electrodes 25 in different electrode groups may also be different.

Further, because of the difference in the gaps between the first electrodes 24 and the second electrodes 25, in order to make the first electrodes 24 contact the corresponding second electrodes, the force applied on the first electrodes 24 and the second electrodes 25 may also be different. Specifically, when the gap is larger, the force required to make the first electrode 24 contact the second electrode 25 may also be larger. Therefore, the size of the gap between the first electrode 24 and the second electrode 25 in each electrode group of the sensing device 23 and the strength of the force applied on the surface of the LCDA to make the first electrode 24 contact the second electrode 25 may have a positive correlation.

A positive correlation of two variables may refer to a relation of the two variables that when one variable changes, the other variable changes in a same direction. Specifically, when one variable changes from a large value to a small value or from a small value to a large value, the other variable also changes from a large value to a small value or from a small value to a large value.

Further, in one embodiment, Gap 1 between the first electrode 24 and the second electrode 25 in the electrode group 231 may be smaller than Gap 2 between the first electrode 24 and the second electrode 25 in the electrode group 232, and Gap 2 between the first electrode 24 and the second electrode 25 in the electrode group 232 may be smaller than Gap 3 between the first electrode 24 and the second electrode 25 in the electrode group 233. Therefore, a first external force required to make the first electrode 24 in the electrode group 231 contact the corresponding second electrode 25 may be smaller than a second external force required to make the first electrode 24 in the electrode group 232 contact the corresponding second electrode 25, and the second external force required to make the first electrode 24 in the electrode group 232 contact the corresponding second electrode 25 may be smaller than a third external force required to make the first electrode 24 in the electrode group 233 contact the corresponding second electrode 25.

When the external force applied on the surface of the LCDA gradually increases, the first electrodes 24 and the second electrodes 25 in the plurality of electrode groups may sequentially become to contact with each other. In one embodiment, when the external force increases to the first external force, the first electrode 24 of the electrode group 231 may become to contact the corresponding second electrode 25 of the electrode group 231; when the external force increases to the second external force, the first electrode 24 of the electrode group 232 may become to contact the corresponding second electrode 25 of the electrode group 232; and when the external force further increases to the third external force, the first electrode 24 of the electrode group 233 may become to contact the corresponding second electrode 25 of the electrode group 233. Therefore, the strength of the applied external force may be determined based on how many first electrodes 24 become to contact with the corresponding second electrodes 25 in the plurality of electrode groups.

Further, depending on the strength of the applied external force, different instructions may be executed. For example, when the external force reaches the first external force, a first operation may be executed; when the external force reaches the second external force, a second operation may be executed; and when the external force reaches the third external force, a third operation may be executed. As such, touch control may be achieved.

In one embodiment, when the first electrode 24 in an electrode group is in contact with the corresponding second electrode 25, a current may pass through the contact between the first electrode 24 and the second electrode 25. When more and more electrode groups having the first electrodes 24 in contact with the corresponding second electrodes 25, the total current may be larger. Therefore, the applied strength of the external force may be determined based on the value of the total current.

When the number of the electrode groups in each sensing device 23 is larger, more strength levels of the applied external force can be distinguished. Therefore, the strength of the applied external force may be more accurately determined.

In one embodiment, the LCDA may only include one sensing device 23, and thus the LCDA may only have one sensing region that is able to determine whether an operator touches the surface of the LCDA and/or how strong the external force is applied. Specifically, the sensing device 23 may correspond to the sensing region.

The sensing region may be located at any position of the LCDA, such as the middle, the lower right corner, and the upper left corner of the LCDA.

In other embodiments, the LCDA may include a plurality of sensing devices 23 and each sensing device 23 may correspond to a sensing region. That is, the surface of the LCDA may include a plurality of sensing regions. Therefore, the LCDA may have multiple regions that can be used to determine whether an operator touches the surface of the LCDA and/or how strong the applied external force is.

In another embodiment, the LCDA includes a plurality of sensing devices 23 and the structures of the plurality of sensing devices 23 are identical. That is, the sensing devices 23 may include a same number of electrode groups. For example, when each sensing device 23 includes more than one electrode groups, every electrode group in one sensing device 23 may correspond to an electrode group in any other sensing device 23. Moreover, the gap in an electrode group of a sensing device 23 may be identical to the gaps in the corresponding electrode groups of other sensing devices 23, and when touch is made to close the gap in any electrode group, the determined strength of the applied external force may be the same.

Figure 4:
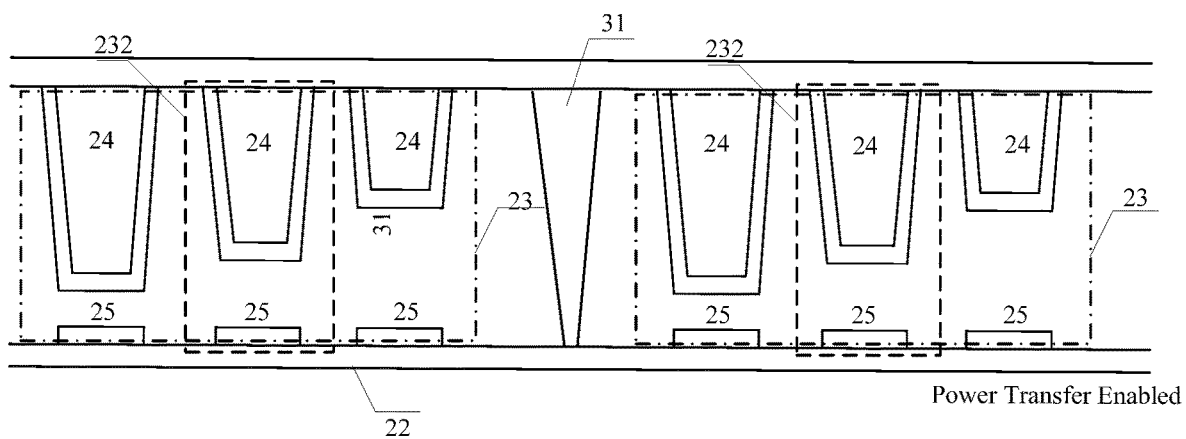
FIG. 4 illustrates a schematic structural view of another LCDA consistent with some embodiments of the present disclosure.

FIG. 4 shows a schematic structural view of another example of LCDAs consistent with some embodiments of the present disclosure. For illustration purpose, although the LCDA may include more than two sensing devices 23, only two sensing devices 23 are displayed in FIG. 4. Referring to FIG. 4, both sensing devices 23 may include a same number of electrode groups. For example, each sensing device 23 may include an electrode group 232 together with other electrode groups (not labeled). Moreover, the gap between the first electrode 24 and the second electrode 25 in the electrode group 232 of one sensing device 23 may be the same as the gap between the first electrode 24 and the second electrode 25 in the electrode group 232 of the other sensing device 23. Therefore, the strength of the force to make the first electrode 24 contact the second electrode 25 in the electrode group 232 of one sensing device 23 may be the same as the strength of the force to make the first electrode 24 contact the second electrode 25 in the electrode group 232 of the other sensing device 23.

In order to improve the strength of the LCDA, the plurality of sensing devices 23 may be supported by a support frame 31. One end of the support frame 31 may be fixed on the first glass layer 21 and the other end of the support frame 31 may be fixed on the second glass layer 22.

When an LCDA include a plurality of sensing devices 23, the total area of the plurality of sensing devices 23 may be greater than or equal to the display output area of the LCDA. That is, the sensing region may be arranged to cover the entire the LCDA. As such, any portion of the touch panel formed by the LCDA may have the function of the above-described sensing device. That is, any region on the touch panel formed by the LCDA may be used for touch control.

Further, because the structures of the sensing devices are the same and the plurality of sensing devices cover the entire LCDA, the first electrodes and the corresponding second electrodes that have a same gap in the plurality of sensing devices may be arranged into an array. For example, referring to FIG. 4, the electrode groups 232 in the plurality of sensing devices 23 may form an array. Similarly, other electrode groups in the plurality of sensing devices 23 may also from arrays. As shown in FIG. 4, each sensing device 23 may also have an electrode group below the electrode group 232 and another electrode group above the electrode group 232, and accordingly, the electrode group below the electrode group 232 may form an array and the electrode group above the electrode group 232 may also form an array.

Therefore, the number of the arrays formed by electrode groups may be equal to the number of electrode groups in each sensing device 23. The position touched by the operator on the display output area may be determined by any array described above.

In one embodiment, the position touched by the operator on the display output area may be determined through an array formed by the electrode groups in the plurality of sensing devices that have the smallest gaps between the first electrodes and the corresponding second electrodes. Specifically, corresponding to a smaller gap, the force required to make the first electrode contact the second electrode may be smaller, and thus, the LCDA may be more sensitive.

In one embodiment, in the plurality of sensing devices, the electrode groups with different gaps (except the electrode groups with the smallest gap between the first electrodes and the second electrodes) between the first electrodes and the second electrodes may be used to detect the change in the strength of the force applied on the corresponding sensing region. That is, the touch position may be first determined by the array of the electrode groups with the smallest gap between the first electrodes and the second electrodes, and the strength of the external force applied to the touch position may then be determined by one or more arrays formed by other electrode groups with a gap between the first electrode and the second electrode larger than the smallest gap.

In other embodiments, the electrode groups with different gaps (including the smallest gap) between the first electrodes and the second electrodes may all be used to detect the change in the strength of the force applied on the corresponding sensing region.

Further, the first electrode of the disclosed LCDA may include a support pillar made of a photo spacer (PS) material, and a conductive coating attached to the support pillar. The second electrode of the LCDA may include a support pillar made of a PS material and a conductive coating attached to the support pillar. In addition, the support frame 31 (referring to FIG. 4) may also be made of a PS material.

Because PS material is plastic, the PS material may be compressed when forced is applied, and when the external force is removed, the PS material may automatically rebound back.

The conductive coating may be used to conduct current when the first electrode and the second electrode contact with each other. The conductive coating may be formed to surround the support pillars.

In an LCDA consistent with the present disclosure, the first glass layer may be a color filter layer. The color filter layer may include a plurality of spaced color filters and a black matrix (BM). The BM may cover the area between neighboring color filters. Each first electrode may be fixed on a unit of the BM in the first glass layer, i.e. the color filter layer. The second glass layer may be a thin-film transistor glass layer. Each second electrode may be fixed on the thin-film transistor glass layer.

Figure 5:
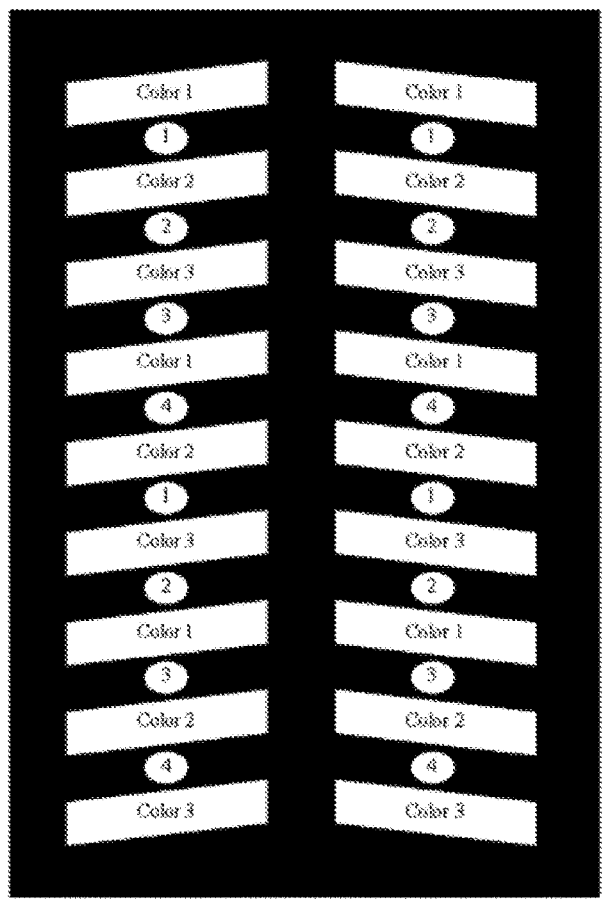
FIG. 5 illustrates a schematic structural view of a color filter layer consistent with some embodiments of the present disclosure.

FIG. 5 illustrates a schematic structural view of a color filter layer consistent with some embodiments of the present disclosure.

Referring to FIG. 5, the color filter layer may be formed by a plurality of spaced color filters and a BM. The BM may cover the area between neighboring color filters. For illustration purpose, each sensing device may be described to include three electrode groups, and may be supported by a support frame. For example, the sensing device 23 in the color filter layer shown in FIG. 5 may be consistent with the sensing device 23 shown in FIG. 3. That is, an example of the sensing device 23 may include three electrode groups, such as electrode group 231, electrode group 232, and electrode group 233. Moreover, the color filter layer is described to include three types of color filters corresponding to three different colors: Color 1 filter, Color 2 filter, and Color 3 filter. Usually, the three types of color filters in a color filter layer are blue color filter, red color filter, and green color filter.

Referring to FIG. 3 and FIG. 5, positions labeled as '1' in FIG. 5 may represent the positions where the electrode groups 231 are bonded to, positions labeled as '2' in FIG. 5 may represent the positions where the electrode groups 232 are bonded to, and positions labeled as '3' in FIG. 5 may represent the positions where the electrode groups 233 are bonded to. In addition, positions labeled as '4' in FIG. 5 may represent the positions where the support frames are bonded to.

Figure 6:
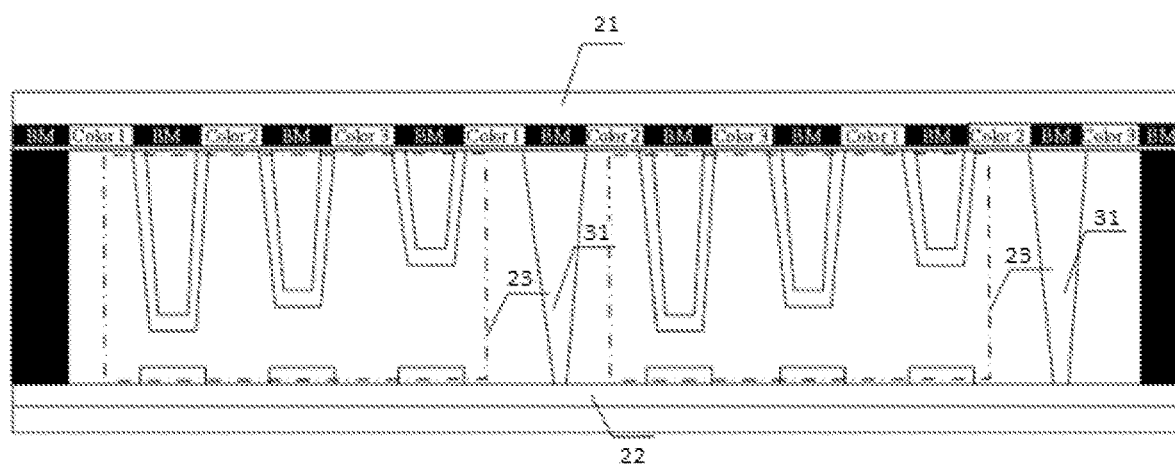
FIG. 6 illustrates a schematic view of an internal structure of an LCDA corresponding to the color filter layer shown in FIG. 5.

FIG. 6 shows a schematic view of the internal structure of the LCDA corresponding to the color filter layer shown in FIG. 5. Referring to FIG. 6, each first electrode may be bonded to a unit of the BM.

In one embodiment, by bonding the electrode groups to the BM, the electrode groups may be shaded by the BM so that user may not be able to see these electrode groups. Therefore, the display function of the LCDA may not be affected by the addition of the touch-control function, and thus user experience may be improved.

Figure 7:
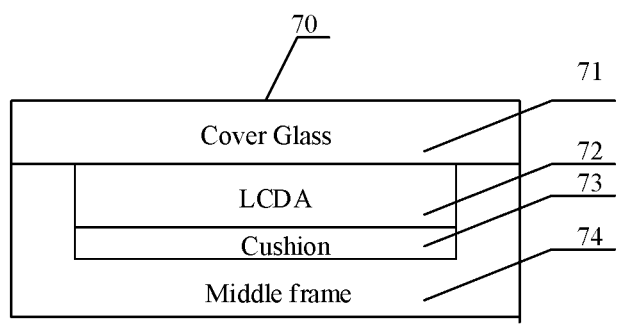
FIG. 7 illustrates a schematic structural view of an example of touch panels consistent with some embodiments of the present disclosure.

FIG. 7 shows a schematic structural view of a touch panel consistent with some embodiments of the present disclosure. Referring to FIG. 7, the touch panel 70 may include a cover glass 71, an LCDA 72 including at least one sensing region as described above, a cushion layer 73, and a middle-frame layer 74.

Figure 1:
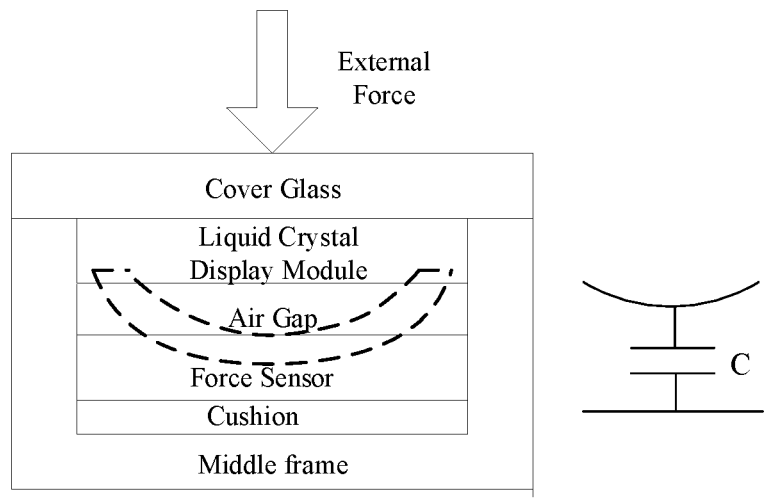
FIG. 1 illustrates a schematic structural view of a conventional touch panel.

As compared to the structure shown in FIG. 1, the structure of the touch panel 70 shown in FIG. 7 has two layers less. Moreover, because reserving a space for the air gap layer is not required, the structure may be conducive to reducing the overall thickness of the touch panel.

The present disclosure also provides an electronic device. The electronic device may include an LCDA. FIG. 2 shows a schematic structural view of an example of LCDAs consistent with some embodiments of the present disclosure.

Referring to FIG. 2, the LCDA may include a first glass layer 21, a second glass layer 22, and at least one sensing device 23. Moreover, the second glass layer 22 may be arranged under the first glass layer 21, and liquid crystals may be filled into the space between the first glass layer 21 and the second glass layer 22. The sensing device 23 may include at least one electrode group 231. Each electrode group 231 may be formed between the first glass layer 21 and the second glass layer 22, and may include a first electrode 24 and a second electrode 25 corresponding to the first electrode 24. Further, the first electrode 24 may be bonded to the first glass layer 21 and the second electrode 25 may be bonded to the second glass layer 22. A gap may separate the first electrode 24 from the corresponding second electrode 25 in each electrode group 231.

Optionally, each sensing device may include at least two electrode groups. When the sensing device of the LCDA includes more than one electrode group, the gaps between the first electrodes and the second electrodes may be different in different electrode groups.

According to the disclosed LCDAs, electrodes are arranged between two glass layers, and a gap separates each electrode from a corresponding electrode. The plurality of electrodes between the two glass layers may further form an array to enable touch detection. Moreover, the sizes of the gaps separating the plurality of electrodes arranged between the two glass layers may be different such that detection of the strength level of the force applied at the touch region may be enabled. That is, a uniform size for the gaps separating the electrodes of the array may allow touch detection in the region, and arranging at least two different sizes for the gaps separating the electrodes of the array may further allow detection of the strength level of the force applied in the region because the difference in the gaps separating the electrodes may correspond to different strength of the force applied. Further, in addition to liquid crystals filled between the two glass layers, a plurality of support pillars may also be arranged to support the two glass layers.

Moreover, in another embodiment of the present disclosure, in order to detect the strength of the applied external force, the gaps separating a plurality of electrodes arranged between two glass layers of the LCDA may have different sizes. However, touch detection in the LCDA may still use conventional touch-control electrodes and display screen to realize. Therefore, as compared to conventional LCDAs, the disclosed LCDAs using gaps with different sizes to separate the plurality of electrodes may demonstrate advantages in detecting the strength of the applied external force.

Compared to conventional LCDAs and electronic device, the disclosed LCDAs and electronic devices may demonstrate advantages in several aspects.

According to the disclosed LCDA and electronic device, the LCDA includes a first glass layer and a second glass layer. The second glass layer may be arranged under the first glass layer, and liquid crystals are filled into the space between the first glass layer and the second glass layer. The LCDA includes at least one sensing device and each sensing device may further include at least one electrode group. Each electrode group may be formed between the first glass layer and the second glass layer, and may include a first electrode and a second electrode corresponding to the first electrode. The first electrode may be bonded to the first glass layer and the second electrode may be bonded to the second glass layer. A gap may separate the first electrode from the second electrode.

Further, when the user touches the surface of an electronic device (e.g. a touch panel) containing a disclosed LCDA, the first electrode and the second electrode may be affected by the external force such that the first electrode and the second electrode may contact each other. As such, whether the user touches the touch panel may be determined. In addition, the disclosed LCDA combines the function of a conventional LCDA together with the function of a force sensor. Because the functions of the conventional LCDA and the force sensor are realized, the air gap may not be a necessary part in the disclosed LCDA. Therefore, the thickness of the touch panel adopting the disclosed LCDA may be reduced.

Further, in the present disclosure, relational terms such as first, second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present specification are described in a progressive manner, in which each embodiment focusing on aspects different from other embodiments, and the same and similar parts of each embodiment may be referred to each other. Because the disclosed devices correspond to the disclosed methods, the description of the disclosed devices and the description of the disclosed methods may be read in combination or in separation.

The description of the disclosed embodiments is provided to illustrate the present invention to those skilled in the art. Various modifications to these embodiments will be readily apparent to those skilled in the art, and the generic principles determined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A liquid crystal display assembly (LCDA), comprising:
a first glass layer including color filters spaced apart with each other by a black matrix;
a second glass layer, arranged with the first glass layer having liquid crystals filled there-between;
at least one sensing device, each fully covered by the black matrix in a plan view and including at least one electrode group, wherein:
a total area of the at least one sensing device is greater than a display output area of the LCDA,
each electrode group is between the first glass layer and the second glass layer, and
each electrode group includes a first electrode bonded to the first glass layer and a second electrode bonded to the second glass layer, wherein a gap separates the first electrode from the second electrode; and
one or more supporting frames, one end of each of the one or more supporting frames being fixed to the black matrix of the first glass layer, and another end of each of the one or more supporting frames being fixed to the second glass layer.

2. The LCDA according to claim 1, wherein:
each sensing device includes at least two electrode groups; and
for different electrode groups in each sensing device, the gaps between the first electrodes and the second electrodes are different.

3. The LCDA according to claim 2, wherein:
a dimension of the gap separating the first electrode from the second electrode in each electrode group of the sensing device is positively correlated with strength of a force applied on a surface of the LCDA that makes the first electrode and the second electrode contact with each other.

4. The LCDA according to claim 3, wherein:
the first electrode is bonded to the black matrix of the first glass layer.

5. The LCDA according to claim 3, wherein:
the second glass layer is a thin-film glass layer; and
the second electrodes are bonded to the thin-film glass layer.

6. The LCDA according to claim 2, including:
one sensing device, and
one sensing region, corresponding to the one sensing device.

7. The LCDA according to claim 2, including:
a plurality of sensing devices, and
a plurality of sensing regions on an outer surface of the LCDA, wherein each sensing device independently corresponds to one sensing region.

8. The LCDA according to claim 7, wherein:
in a case that first and second electrodes having a same gap among the plurality of sensing devices become in contact with each other, the strength of the force is sensed a same.

9. The LCDA according to claim 8, wherein:
an array formed by the first and second electrodes having a smallest gap there-between among the plurality of sensing devices detect a touch position on the display output area.

10. The LCDA according to claim 8, wherein:
the first and second electrodes having different gaps there-between among the plurality of sensing devices detect strength changes of the force applied on corresponding sensing regions.

11. The LCDA according to claim 1, wherein:
the first electrode includes a support pillar made of a photo spacer (PS) material and a conductive coating attached to the support pillar.

12. An electronic device, comprising:
a liquid crystal display assembly (LCDA) including:

a first glass layer including color filters spaced apart with each other by a black matrix, a second glass layer, arranged with the first glass layer having liquid crystals filled there-between, at least one sensing device, each fully covered by the black matrix in a plan view and including at least one electrode group, wherein:

a total area of the at least one sensing device is greater than a display output area of the LCDA;

each electrode group is between the first glass layer and the second glass layer, and each electrode group includes a first electrode bonded to the first glass layer and a second electrode bonded to the second glass layer, wherein a gap separates the first electrode from the second electrode; and one or more supporting frames, one end of each of the one or more supporting frames being fixed to the black matrix of the first glass layer, and another end of each of the one or more supporting frames being fixed to the second glass layer.

13. The electronic device according to claim 12, wherein:

each sensing device includes at least two electrode groups; and for different electrode groups in each sensing device, the gaps between the first electrodes and the second electrodes are different.

14. The electronic device according to claim 13, wherein:

a dimension of the gap separating the first electrode from the second electrode in each electrode group of the sensing device is positively correlated with strength of a force applied on a surface of the LCDA that makes the first electrode and the second electrode contact with each other.

15. The electronic device according to claim 14, including:

one sensing device, and one sensing region, corresponding to the one sensing device.

16. The electronic device according to claim 14, including:

a plurality of sensing devices, and a plurality of sensing regions on an outer surface of the LCDA, wherein each sensing device independently corresponds to one sensing region.

17. The electronic device according to claim 16, wherein:

in a case that first and second electrodes having a same gap among the plurality of sensing devices become in contact with each other, the strength of the force is sensed a same.

18. The electronic device according to claim 17, wherein:

an array formed by the first and second electrodes having a smallest gap there-between among the plurality of sensing devices detect a touch position on the display output area.

19. The electronic device according to claim 18, wherein:

the first and second electrodes having different gaps there-between among the plurality of sensing devices detect strength changes of the force applied on corresponding sensing regions.

* * * * *